United States Patent
Biddle et al.

(10) Patent No.: US 10,858,285 B2
(45) Date of Patent: Dec. 8, 2020

(54) ENHANCEMENT OF REINFORCING FIBERS, THEIR APPLICATIONS, AND METHODS OF MAKING SAME

(71) Applicant: FORTA CORPORATION, Grove City, PA (US)

(72) Inventors: Daniel T. Biddle, Grove City, PA (US); Christopher P. Lovett, Harrisville, PA (US)

(73) Assignee: FORTA CORPORATION, Grove City, PA (US)

( * ) Notice: Subject to any disclaimer, the term of this patent is extended or adjusted under 35 U.S.C. 154(b) by 0 days.

(21) Appl. No.: 16/251,682

(22) Filed: Jan. 18, 2019

(65) Prior Publication Data

US 2019/0152848 A1 May 23, 2019

Related U.S. Application Data

(62) Division of application No. 15/700,261, filed on Sep. 11, 2017.

(60) Provisional application No. 62/385,410, filed on Sep. 9, 2016.

(51) Int. Cl.
| | |
|---|---|
| C04B 20/00 | (2006.01) |
| C04B 28/02 | (2006.01) |
| D01F 6/04 | (2006.01) |
| D01F 8/06 | (2006.01) |
| D01F 1/10 | (2006.01) |
| C04B 111/34 | (2006.01) |

(52) U.S. Cl.
CPC .......... *C04B 20/0068* (2013.01); *C04B 28/02* (2013.01); *D01F 1/10* (2013.01); *D01F 6/04* (2013.01); *D01F 8/06* (2013.01); *C04B 2111/34* (2013.01); *D10B 2505/02* (2013.01)

(58) Field of Classification Search
CPC . C04B 28/02; C04B 20/00; D01F 6/04; D01F 8/06
USPC ................................................ 524/59, 424
See application file for complete search history.

(56) References Cited

U.S. PATENT DOCUMENTS

| | | |
|---|---|---|
| 5,891,374 A | 4/1999 | Shah et al. |
| 6,506,873 B1 | 1/2003 | Ryan et al. |
| 6,565,348 B1 | 5/2003 | Snijder et al. |
| 6,682,789 B2 | 1/2004 | Godavarti et al. |
| 8,455,088 B2 | 6/2013 | Schewe et al. |
| 9,321,686 B2 | 4/2016 | Lovett et al. |
| 2003/0228454 A1* | 12/2003 | Barlow ............... C08L 2203/12 428/297.4 |
| 2006/0078729 A1 | 4/2006 | Yabuki et al. |
| 2013/0052448 A1 | 2/2013 | Korte |
| 2013/0344325 A1 | 12/2013 | Nguyen et al. |
| 2014/0274815 A1 | 9/2014 | Lovett et al. |
| 2014/0316063 A1 | 10/2014 | Hochstetter et al. |
| 2015/0005413 A1* | 1/2015 | Yamazaki ............... C08J 3/226 523/447 |
| 2016/0289119 A1 | 10/2016 | Hitomi et al. |

FOREIGN PATENT DOCUMENTS

| | | |
|---|---|---|
| WO | WO2013/122209 | * 8/2013 |
| WO | WO 2014/181036 | * 11/2014 |
| WO | 2015194457 A1 | 12/2015 |

OTHER PUBLICATIONS

International Search Report and Written Opinion, PCT/US2017/050885, 13 Pages.
European Extended Search Report Issued in EP Patent Application No. 17849700.4, dated Mar. 5, 2020.

* cited by examiner

*Primary Examiner* — Deve V Hall
(74) *Attorney, Agent, or Firm* — Eckert Seamans Cherin & Mellott; Carol A. Marmo

(57) ABSTRACT

The invention relates to composite reinforcing fibers infused or compounded with pulp fibers and/or nano-fibers. The composite reinforcing fibers are composed of polymer, e.g., polymer resin. The pulp fibers and/or nano-fibers impart improved tensile strength to the composite reinforcing fibers, as well as a resulting product formed by the fibers. The composite reinforcing fibers may be used in a variety of cementitious applications, wherein traditional reinforcing fibers are typically used.

5 Claims, No Drawings

ENHANCEMENT OF REINFORCING FIBERS, THEIR APPLICATIONS, AND METHODS OF MAKING SAME

CROSS-REFERENCE TO RELATED APPLICATIONS

This divisional patent application claims priority from U.S. patent application Ser. No. 15/700,261, filed on Sep. 11, 2017, which claims priority from provisional patent application No. 62/385,410, entitled "ENHANCEMENT OF REINFORCING FIBERS, THEIR APPLICATIONS, AND METHODS OF MAKING SAME", filed on Sep. 9, 2016, the contents of which are incorporated herein by reference.

FIELD OF THE INVENTION

The invention generally relates to reinforcing fibers for cementitious applications and, more particularly, to reinforcing fibers that are enhanced or infused with material, such as, pulp and/or nano-type fibers, during manufacture to improve characteristics and performance of the reinforcing fibers in a wide variety of concrete, drilling, coating, and asphalt applications.

BACKGROUND

Reinforcing fibers are generally known in the art for use in various cementitious compositions and applications. Synthetic fibers that are used for concrete reinforcing are effective to control temperature-related cracking in many concrete applications, by reducing the effects of concrete shrinkage and drying during the early stages of the life of the concrete. This early-age reduction of drying and curing stresses are important contributions by synthetic fibers, which also contribute in some measure to improved hardened-concrete properties. However, ultimately, the low tensile strength of the fibers in relation to the hardened concrete prevent further enhancement of hardened concrete properties. It is contemplated that if synthetic reinforcing fibers were made stronger, i.e., having a higher tensile strength, the long-term hardened concrete properties could be further improved.

There are known synthetic materials that demonstrate very high strength. However, these materials are typically not added directly to concrete, asphalt, or related mediums due to one or more concerns, such as, high cost, non-uniform mixing and distribution, lack of suitable surface finish, and the like. Other currently available synthetic fibers, such as FORTA-FERRO® fibers by FORTA Corporation, are known to be cost-effective, distribute extremely uniformly in wet concrete, and allow for a superior surface finish. However, these synthetic fibers tend to have insufficient strength to contribute in a large extent to hardened concrete properties.

It is contemplated that the infusion of high-strength fibers in low-cost synthetic reinforcing fibers that uniformly mix and distribute, and have superior surface finish, can provide optimal reinforcing fibers that exhibit improved hardened concrete properties in cementitious applications.

Thus, there is a need in the art to modify existing concrete reinforcing fibers, such as FORTA-FERRO® fibers by FORTA Corporation, to make them stronger, i.e., have a higher tensile strength, such that additional hardened concrete properties may be achieved.

Furthermore, certain market-available fibers, such as Super-Sweep Fine® polypropylene fibers by FORTA Corporation, which are traditionally added to and blended in dry cement to provide a measure of crack prevention in cement well casings, can be modified to realize additional desirable properties to the hardened cement casing.

SUMMARY OF THE INVENTION

An aspect of the invention provides a composite reinforcing fiber that includes a synthetic polymer resin, and a fiber component selected from the group consisting of pulp fiber, nano-fiber, and mixtures or blends thereof.

The fiber component can be composed of a material selected from carbon, mica, aramid, polyacrylonitrile, carbon nano-fiber, carbon nano-tube, graphene nano-ribbon and mixtures thereof. In certain embodiments, the pulp fiber includes aramid.

The fiber component may have a higher tensile strength, as compared to a reinforcing fiber absent of said fiber component.

The fiber component may have a length from about 0.5 to about 1.0 mm.

The synthetic polymer resin can be selected from polyethylene, polypropylene, and mixtures or blends thereof.

In another aspect, the invention provides a method of preparing a composite reinforcing fiber. The method includes obtaining a synthetic polymer resin; compounding the synthetic polymer resin with a fiber component selected from pulp fiber, nano-fiber and mixtures thereof; forming a resin/fiber blend; melting the resin/fiber blend; and extruding the resin/fiber blend to form the composite reinforcing fiber.

The method can also include compounding the fiber component with a water soluble resin prior to compounding the synthetic polymer resin with the fiber component. The water-soluble resin may be selected from polyethylene, polypropylene and mixtures thereof. The method can also include extruding the fiber component with the water soluble resin and creating a master batch in pellet form.

DETAILED DESCRIPTION OF PREFERRED EMBODIMENTS

The invention provides reinforcing fibers have improved properties or characteristics, as compared to known or traditional reinforcing fibers for use in cementitious mediums. Synthetic fibers are known in the art and are traditionally used for reinforcing concrete and the like. These synthetic fibers distribute well in concrete, asphalt, and drilling mediums. An advantage of these fibers is their low cost, however, a disadvantage is that they exhibit low strength, i.e., low tensile strength. There are various high-strength fibers that are known in the art, but they do not exhibit the reinforcing properties provided by the synthetic reinforcing fibers.

It is an objective of the invention to provide reinforcing fibers for cementitious applications that exhibit the properties or characteristics of traditional synthetic fibers, as well as an improvement in strength, e.g., tensile strength, as compared to the strength exhibited by the traditional fibers. In accordance with the invention, synthetic reinforcing fibers are combined or infused with high-strength material, e.g., fibers, to produce high-strength reinforcing fibers that continue to provide the performance properties traditionally associated with the synthetic reinforcing fibers and additionally, exhibit a higher tensile strength. The material can include pulp fibers and/or nano-fibers. The combination or infusion of this material with the synthetic fibers can be carried out during various steps of the manufacture process.

It has been found that synthetic reinforcing fibers can act as a "carrier" for high-strength fibers. The synthetic reinforcing fibers are composed of polymer, e.g., synthetic polymer resin, including but not limited to polyolefin, such as, polypropylene, polyethylene, and mixtures or blends thereof. The high-strength material includes pulp fibers, nano-fibers, and mixtures or blends thereof. During manufacture of the synthetic reinforcing fibers, e.g., carrier fibers, they can be infused with the pulp fibers and/or nano-fibers. Infusion of the carrier fibers can be conducted during the manufacture process. For example, the infusion can be carried out during extrusion. As a result of infusion, the stronger fibers impart increased tensile strength or other strength-related characteristics to the reinforcing fibers.

The high-strength material, e.g., pulp fibers and nano-fibers, can be composed of carbon, mica, aramid, polyacrylonitrile and other high-strength materials, which are typically compounded in the plastics industry, as well as carbon nano-tubes and graphene nano-ribbons. The pulp fibers and/or nano-fibers are capable of enhancing strength properties, such that the reinforcing fibers compounded with these other fibers exhibit strength properties that are improved as compared to synthetic reinforcing fibers absent of the pulp fibers and/or nano-fibers.

It is understood that the invention encompasses a variety of known reinforcing, e.g., carrier, fibers. However, for ease of description, polypropylene and polyethylene reinforcing fibers are recited herein.

In certain embodiments, a highly-fibrillated, aramid pulp fiber is infused into polypropylene and/or polyethylene during production of the synthetic reinforcing fiber. The resulting fiber has a higher tensile strength than a polypropylene and/or polyethylene reinforcing fiber absent of the aramid pulp fiber. In certain embodiments, the compounding of the aramid pulp fiber and the polypropylene and/or polyethylene reinforcing fiber is effective to protect the aramid fiber from potential alkali attack when used in Portland cement applications. The aramid pulp fiber has demonstrated an ability to provide excellent reinforcement under shear stresses.

The length of the pulp fiber can vary and, in certain embodiments, is from about 0.5 to about 1.0 mm.

The specific gravity of the pulp fiber can vary and, in certain embodiments, is about 1.45.

The nano-fibers can include, for example, recycled or virgin carbon nano-fibers. These fibers are added to polypropylene and/or polyethylene during production of the synthetic reinforcing fiber to enhance the strength of the resulting polypropylene and/or polyethylene reinforcing fiber and ultimately, to enhance performance properties in cementitious applications that contain the resulting polypropylene and/or polyethylene reinforcing fibers infused with the carbon nano-fibers.

In certain other embodiments, mica fiber granules are added to polypropylene during initial synthetic reinforcing fiber production to enhance the strength of the resulting polypropylene reinforcing fiber, as well as allow a degree of acid solubility in cement casing applications.

In accordance with the invention, the pulp fibers and/or nano-fibers can themselves be combined, e.g., compounded, with a water soluble resin prior to introduction into the synthetic reinforcing fiber production process. Compounding with a water soluble resin enables these pulp fibers and/or nano-fibers, which can be short-length fibers, to be dry blended in cementitious mixtures that are used in a wide variety of applications in the drilling, coatings, concrete and asphalt industries.

In certain embodiments, the pulp fibers and/or nano-fibers are extruded with the water soluble resin to create a master batch in pellet form. The master batch can be used by itself or blended with different lengths and shapes of fibers. Without intending to be bound by any particular theory, it is believed that the pellet shape contributes to uniform distribution of the master batch during the dry blending process. Upon the addition of water or an activation liquid during the mixing cycle, the water soluble resin begins to break down. As the resin breaks down, individual fibers of the master batch are released from the pellet and uniformly distributed throughout the mix.

There are various methods for infusing or compounding the synthetic reinforcing fibers with the pulp fibers and/or nano-fibers. For example, raw pulp fibers and/or nano-fibers can be added directly into a fiber melt and extrusion process. In certain embodiments, during this process, synthetic resins selected from polypropylene and/or polyethylene and pulp fibers and/or nano-fibers selected from aramid and/or carbon, are blended together and processed through an extruder. The pulp fibers and/or nano-fibers can be fed into the extrusion process by a volumetric or loss-in-weight feeder. The use of this type or design of feeder ensures an accurate blend ratio of pulp fibers and/or nano-fibers to synthetic resin(s) is achieved based on extruder output. The blending of the fibers with the resin component occurs prior to entering the screw and barrel. Upon introduction of the fibers and resin(s) to the screw and barrel, the resins begin to melt and encompass the pulp fibers and/or nano-fibers.

In certain embodiments, the method of incorporating pulp and/or nano-fibers into the fiber melt and extrusion process includes compounding the pulp fibers and/or nano-fibers into a resin themselves (e.g., producing a compounded resin). The resin can be a water soluble resin, such as, but not limited to polyethylene, polypropylene and blends thereof. Subsequently, the synthetic resin and the compounded resin are blended together during the extrusion process. The pulp fibers and/or nano-fibers being compounded into a polyethylene or polypropylene resin, creates a master batch which contains the highest percentage of pulp fibers and/or nano-fibers that the polyethylene or polypropylene is capable of carrying in resin form. The master batch resin is then fed into the extrusion process by way of a volumetric feeder or loss-in-weight feeder. The master batch resin containing the pulp fibers and/or nano-fibers is fed into the extruder at a rate that results in an optimum portion of pulp fibers and/or nano-fibers within the finished reinforcing composite. The pulp fibers and/or nano-fibers can constitute from about 0.05 to about 4.0 percent by weight, based on total weight of the reinforcing composite. The mixing and blending of resins and master batch occurs prior to introduction to the barrel and screw of the extruder. In the extruder barrel, which typically operates at a temperature from about 230° F. to 270° F., the extruder screw further mixes the master batch and resins to form a substantially uniform mixture of the pulp fibers and/or nano-fibers, and resin. The composite material is forced through the extruder die, and the result is an even distribution of pulp and/or nano-fibers within the strands of extruded composite material, e.g., fibers.

The infused reinforcing fibers in accordance with the invention may be employed in a wide variety of applications, including but not limited to the following applications. Polypropylene macro synthetic reinforcing fibers infused with aramid pulp fibers and/or carbon nano-fibers can be added to Portland cement applications for improved performance. The composite fibers impart improved tensile strength, flexural strength, and compressive strength to the cast-in-place, precast, or shotcrete concrete applications. The infused fibers can contribute to reducing the cross-section or thickness of conventional floor and pavement slabs. The infused fibers can add strength and toughness characteristics to Ultra High Performance Concrete (UHPC) precast segments for bridges, wall cladding, pipe, and the like.

Polypropylene, polyethylene, or other synthetic fibers infused with mica provide fibers with higher strength for use in down-hole cement casing linings for wellbores, adding tensile and compressive strengths to the lining. The mica-infused fibers can also allow a degree of acid solubility to the fibers, which is advantageous in drilling zones where fibers are used as a lost-circulation additive in both cement and drilling fluids.

Polypropylene macro synthetic fibers can be infused with polyacrylonitrile (PAM) nano-fibers and/or PAM polymer resin to provide one or more of the following benefits:
(i) raise the melt temperature of the composite fibers, as acrylic fibers melts above 300 degrees C.;
(ii) increase the tensile strength of the composite fibers, as acrylic fibers are the precursor of carbon fibers; and
(iii) add an element of internal-cure capacity to the resulting composite fibers, as PAM fibers can accept and retain water, and thereby release the moisture slowly back into a curing concrete medium.

Polyolefin, e.g., polypropylene, micro-monofilament fibers may be infused with pulp fibers and/or nano-fibers to provide various physical characteristic changes to the fibers themselves, and to the end use or application. Polypropylene micro-monofilament fibers infused with carbon nano-fibers produce fibers having enhanced strength and/or stiffness. Both of these properties facilitate optimum performance when dry-blending fibers with cement powder used for well casings. The additional strength of the fibers provides improved cement casing strength and durability. The additional stiffness of the fibers facilitates enhanced uniform dry-mixing capacity in dry-packaged goods applications, such as cement, cementitious coatings, and the like.

Polypropylene macro synthetic reinforcing fibers infused with aramid pulp fibers and carbon nano-fibers may provide certain deformities on the surface of the composite fibers and increase the surface area, thereby increasing the mechanical bond of these fibers with a concrete or asphalt matrix.

Without intending to be bound by any particular theory, it is believed that the pulp fibers and/or nano-fibers infused into the reinforcing fibers may become oriented or aligned into a continuous strands within the reinforcing fibers, due to the pressure generated by the molten materials forced through the extrusion die. The continuous high-strength internal strands may also contribute to enhancing the strength of the resulting fibers.

Infusing macro synthetic reinforcing fibers, e.g., made of polypropylene and/or polyethylene, with high-strength pulp fibers and/or nano-fibers is expected to increase the tensile strength of the resulting composite reinforcing fibers. This increase in composite fiber strength is expected to provide improved hardened concrete properties in a variety of concrete applications.

As used herein, the term "tensile strength" means the maximum tensile stress per unit of cross-sectional area of an unstrained specimen. As used herein, the term "tenacity" means the tensile strength expressed as force per unit linear density of an unstrained specimen. The increased tensile strength and improved tenacity of the composite fibers, by adding pulp fibers and/or nano-fibers, can be measured by fiber-strand test methods, such as ASTM D 3218-07 "Standard Specification for Polyolefin Monofilaments". Comparisons of tensile strength, which is the tensile stress divided by the cross-sectional area, would be measured in units of "MPa" or "lbf". Comparisons of tenacity, which is the tensile stress divided by the linear density, would be measured in grams per denier (gpd).

Enhanced hardened-concrete post-crack properties resulting from macro synthetic reinforcing fibers infused with pulp fibers and/or nano-fibers, may be measured by concrete test methods, such as ASTM C 1609/C 1609M-12 "Standard Test Method for Flexural Performance of Fiber-Reinforced Concrete Using Beam With Third-Point Loading.

Infusing macro synthetic reinforcing fibers with pulp fibers and/or nano-fibers can alter the surface texture of the resulting fibers, and thereby enhance the mechanical bond of the fibers with a concrete matrix. The bond improvement can be measured by concrete bond or pull-out test methods, such as ASTM C 234-91a "Test Method for Bond Strength".

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

We claim:

1. A method of preparing a composite reinforcing fiber, comprising:
    obtaining a water soluble first resin;
    obtaining a fiber component, comprising:
        a blend, comprising:
            pulp fiber; and
            nano-fiber composed of a material selected from the group consisting of carbon, aramid, polyacrylonitrile and mixtures thereof;
    compounding the first resin and the fiber component to form a compounded second resin;
    obtaining a third resin comprising synthetic polymer; and
    extruding to blend and melt together the third resin and the second resin to form the composite reinforcing fiber.

2. A method of preparing a composite reinforcing fiber, comprising:
    obtaining a water soluble first resin;
    obtaining a fiber component selected from the group consisting of pulp fiber, nano-fiber and mixtures thereof;
    compounding the fiber component with the first resin to form a compounded second resin;
    extruding the second resin to form a master batch;
    obtaining a third resin comprising synthetic polymer; and
    extruding to blend and melt together the third resin and the master batch to form the composite reinforcing fiber.

3. A method of preparing a composite reinforcing fiber, comprising:
    obtaining a synthetic polymer resin;
    obtaining a water soluble resin;
    obtaining a fiber component selected from the group consisting of pulp fiber, nano-fiber and mixtures thereof;
    compounding the fiber component with the water soluble resin;

extruding the compounded fiber component with the water soluble resin and creating a master batch in pellet form;

compounding the synthetic polymer resin with the master batch in pellet form;

forming a resin/fiber blend;

melting the resin/fiber blend; and extruding the resin/fiber blend to form the composite reinforcing fiber.

4. The method of claim 1, wherein the water soluble first resin is selected from the group consisting of polyethylene, polypropylene and mixtures thereof.

5. The method of claim 1, wherein the melt is conducted in an extruder barrel and screw.

\* \* \* \* \*